United States Patent

Margotte et al.

[11] Patent Number: 5,973,107
[45] Date of Patent: Oct. 26, 1999

[54] PROCESS FOR PRODUCING POLYACRYLATES HAVING A LOW CONTENT OF RESIDUAL ACRYLATE MONOMERS

[75] Inventors: Dieter Margotte, Krefeld; Christian Wamprecht, Nuess; Josef Pedain, Köln; Hartwig Höcker; Volker Rohde, both of Aachen, all of Germany

[73] Assignee: Bayer Aktiengesellschaft, Leverkusen, Germany

[21] Appl. No.: 08/899,930

[22] Filed: Jul. 24, 1997

[30] Foreign Application Priority Data

Aug. 5, 1996 [DE] Germany ............ 196 31 585

[51] Int. Cl.$^6$ ................ C08F 6/00; C08F 6/10
[52] U.S. Cl. ......................... 528/486; 528/491
[58] Field of Search ............... 528/486, 491; 526/86, 87

[56] References Cited

U.S. PATENT DOCUMENTS 3,832,317  8/1974  Mikofalvy et al. .......... 526/87 X
4,476,262 10/1984  Chu et al. .................. 523/412
5,767,231  6/1998  Schull et al. ........... 526/329.7 X

FOREIGN PATENT DOCUMENTS 2076236  2/1993  Canada .
2123537 11/1994  Canada .
2126112 12/1994  Canada .
0 034 204  8/1981  European Pat. Off. .
0 574 248 12/1993  European Pat. Off. .
150212  8/1981  Germany .
264004  1/1989  Germany .

*Primary Examiner*—Fred Teskin
*Attorney, Agent, or Firm*—Joseph C. Gil; Thomas W. Roy

[57] ABSTRACT

The present invention relates to a process for producing a polyacrylate resin having a residual acrylate monomer content of <0.1% by weight, based on resin solids, by preparing an initial polyacrylate resin and subsequently polymerizing this initial polyacrylate resin in the presence of a monomer having a low vapor pressure, such as maleic anhydride, and a peroxide initiator to reduce the monomer content.

10 Claims, No Drawings

PROCESS FOR PRODUCING POLYACRYLATES HAVING A LOW CONTENT OF RESIDUAL ACRYLATE MONOMERS

BACKGROUND OF THE INVENTION

1. Field of the Invention

The present invention relates to a process for producing polyacrylates having a low content of residual acrylate monomers.

2. Description of the Prior Art

The radically-induced polymerization of $\alpha,\beta$-unsaturated monomers and other monomers which are capable of undergoing radically-induced polymerization is well known. Recent patent applications are mainly concerned with special production processes or special monomer compositions that can be used to obtain defined properties. For example, polymerization processes for producing polyacrylates, which are characterized by significantly improved physical drying properties, are described in EP-A 528,304 and in EP-A 625,529.

Many patent applications describe the production of polyacrylates containing functional groups. For example, EP-A 630,923 describes polyacrylates containing OH groups, which can be combined with polyisocyanates and which result in crosslinked films.

During the radically-induced polymerization of acrylate monomers with peroxide initiators in solution, a feature which cannot be avoided is that a certain portion of the acrylate monomers is not polymerized and remains in the reaction solution. The resulting content of residual monomers varies between 0.5 and 2% by weight.

More stringent environmental standards require that the polyacrylates, which are offered for use in two-component polyurethane coating compositions (PUR) lacquers, have low monomer contents such that during the production of films, substances are not released into the environment which are either toxic or involve pollution of the environment.

An object of the present invention is to develop a process for producing polyacrylates which enables the content of residual acrylate monomers to be reduced to <0.1%, for example.

DD-A 150,212 describes acrylate-maleic anhydride copolymers for use in the production of films, in which the residual maleic acid content is considerably reduced by vinyl ethers or styrene, for example. In DD-A 264,004, the residual monomer content in styrene/acrylonitrile copolymers and in graft polymers on a butadiene rubber is also significantly reduced by the addition of vinyl esters of organic carboxylic acids, such as vinyl acetate or vinyl butyrate.

A disadvantage of both these processes is that after this subsequent treatment the polyacrylate solution contains, instead of the initial monomers, the monomers (vinyl ethers and vinyl acetate) which were added to reduce the initial monomer. Due to their vapor pressure, these added monomers are released to the environment during cure.

Another prior art process is directed to subsequently activating the polymerization batch with peroxide after the completion of polymerization and then of continuing to maintain it at the polymerization temperature for a period time. The monomer content can also be reduced if the polymer solution is distilled after production of the polyacrylate is complete. The residual monomer contents are only reduced to about 0.4% by weight with both of these prior art processes.

Surprisingly, it has now been found that the content of acrylate monomer can be lowered to <0.1% by weight if the reaction solution is mixed at the end of the polymerization with a monomer having a low vapor pressure and a peroxide initiator and subsequently polymerized.

SUMMARY OF THE INVENTION

The present invention relates to a process for producing a polyacrylate resin having a residual acrylate monomer content of <0.1% by weight, based on resin solids, by preparing an initial polyacrylate resin and subsequently polymerizing this initial polyacrylate resin in the presence of a monomer having a low vapor pressure and a peroxide initiator to reduce the monomer content.

DETAILED DESCRIPTION OF THE INVENTION

In the process according to the present invention the low vapor pressure monomer is preferably used in an amount of 0.5 to 3, preferably 1 to 2% by weight and the peroxide initiator is used in an amount of 0.5 to 3, preferably 1 to 2% by weight, wherein the percentages are based on the polyacrylate polyol starting material. The polymerization reaction is preferably conducted for 1 to 3, preferably 1 to 2 hours, at a temperature of 100 to 200° C., preferably 100 to 160° C. Maleic anhydride is the preferred low vapor pressure monomer.

The products according to the present invention do not release irritant or polluting substances to the environment, even after curing with polyisocyanates.

Preferably, the polyacrylate resins to be treated according to the invention have an average molecular weight (number average), as determined by gel permeation chromatography, of 1000 to 40,000, particularly 2002 to 30,000. The weight average molecular weights are preferably between 2000 and 80,000, particularly between 4000 and 60,000. The molecular weights of the polyacrylates are determined by the methods described by Z. Grabisic, P. Rempp and H. Benoit in J. Polymer Sc., Part B, Polym. Lett. 5 (1967), page 753.

The polyacrylates according to the present invention are preferably synthesized from the following monomers:
0 to 50, preferably 2.5 to 40% by weight of monomers A),
30 to 90, preferably 40.5 to 80% by weight of monomers B),
0 to 50, preferably 0 to 30% by weight of monomers C),
0 to 5, preferably 0 to 3% by weight of monomers D), and
0 to 50, preferably 0 to 30% by weight of monomers E).

The group A) monomers contain hydroxyl groups, such as hydroxyalkyl esters of $\alpha,\beta$-unsaturated carboxylic acids, preferably acrylic acid or methacrylic acid, which contain 2 to 12, preferably 2 to 6 carbon atoms in the hydroxyalkyl radical. Examples include 2-hydroxyethyl acrylate, isomeric hydroxypropyl acrylates, particularly those obtained by the addition of propylene oxide to acrylic acid, isomeric hydroxybutyl acrylates, hydroxypentyl acrylates, hydroxyhexyl acrylates and the corresponding methacrylates. Preferred monomers A) are 2-hydroxyethyl (meth)acrylate and/or the isomeric hydroxypropyl (meth)acrylates.

The hydroxyalkyl esters may contain both primary or secondary hydroxyl groups. Monomers A) are used in amounts such that the resulting acrylate resins have a hydroxyl group content of 0 to 7.3, preferably 0.3 to 5.8% by weight, based on resin solids.

Methyl methacrylate is used as monomer B) and styrene is used as optional monomer C). Optional monomers D) are selected from olefinically unsaturated carboxylic acids, such as acrylic acid, methacrylic acid, itaconic acid, crotonic acid and/or semi-esters of maleic or fumaric acid. Acrylic acid and methacrylic acid are preferred.

Optional monomers E) are selected from olefinically unsaturated monomers other than monomers A) to D). Examples include (cyclo)alkyl esters of acrylic or methacrylic acid containing 1 to 18, preferably 1 to 10, carbon atoms in their alkyl or cycloalkyl radicals, such as methyl, ethyl, n-propyl, n-butyl, isopropyl, isobutyl, t-butyl, isomeric pentyl, hexyl, octyl, dodecyl, hexadecyl, octadecyl, 3,5,5-trimethylcyclohexyl, isobornyl and/or cyclohexyl radicals. Also suitable are acrylonitrile, ethyl vinyl ether, ethacrylonitrile, vinyl acetate, vinyl chloride and vinyltoluene, and other anhydride-functional, unsaturated monomers such as itaconic anhydride or maleic anhydride. Mixtures of these monomers may also be used.

The copolymerization reaction is preferably conducted in organic solution in the presence of known solvents. Examples include toluene, xylene, n-butyl acetate, ethyl acetate, ethyl glycol acetate, isomeric pentyl acetates, hexyl acetates, methoxypropyl acetates, tetrahydrofuran, dioxane, acetone, methyl ethyl ketone and methyl isobutyl ketone. Also suitable are mixtures of higher-boiling aromatic compounds, such as Solvent Naphtha solvents, homologs of benzene, the Solvesso solvents, the Shellsol solvents; and also high-boiling, aliphatic and cycloaliphatic hydrocarbons, such as white spirit, mineral turpentine, the Isopar solvents, the Nappar solvents, tetralin and decalin. Mixtures of solvents may also be used.

Preferred solvents are n-butyl acetate, methoxypropyl acetate and xylene, as well as mixtures of these solvents. During the polymerization reaction, the solvents are generally used in amounts of 30 to 70% by weight, based on the weight of the reaction mixture. Depending upon the peroxide used, the polymerization temperature is generally 90 to 200° C., preferably 100 to 160° C.

Suitable initiators are preferably those having a half-life between 0.5 minutes and 2 hours at the reaction temperature. Examples include dilauryl peroxide, tert.-butylperoxy-2-ethylhexanoate, tert-butylperoxy-diethyl acetate, dibenzoyl peroxide, tert.-butylperoxy isobutyrate, 1,1-di-tert.-butylperoxy-3,3,5-trimethylcyclohexane, 1,1-di-tert.-butylperoxycyclohexane, tert.-butylperoxy-3,3,5-trimethyl hexanoate, tert.-butylperoxyisopropyl carbonate, di-tert.-butyl peroxide, 2,2-di-tert.-butylperoxybutane and tert.-butylperoxystearyl carbonate.

The initiators are preferably used in an amount of 0.5 to 5, preferably 1 to 4% by weight, based on the weight of monomers A) to E). These percentages are also based on solvent-free initiators.

The polyacrylate resins are most preferably produced using n-butyl acetate as the solvent and tert.-butylperoxy-2-ethylhexanoate as the initiator at temperatures of 100 to 130° C. and di-tert.-butyl peroxide as the initiators at temperatures of 130 to 200° C. The polyacrylates which are produced in this manner have a residual monomer content of about 0.5 to 3% by weight.

The residual monomer content can be reduced to <0.1% by weight by a subsequent radically-induced polymerization in the presence of 0.5 to 2% by weight of maleic anhydride and 0.5 to 2% by weight of peroxide.

After the radically-induced polymerization is complete, the subsequent polymerization is carried out directly in the presence of maleic anhydride.

The polyacrylates produced by the process according to the invention can be used without additional crosslinking agents (polyisocyanates) for industrial applications which are not high-duty applications. Polyacrylates which are free from OH groups are preferably used for applications of this type.

For industrial applications requiring higher levels of solvent and chemical resistance, for example, OH-functional polyacrylates are used in combination with known lacquer polyisocyanates as crosslinkers. The lacquer polyisocyanates are those which preferably contain biuret, urethane, allophanate, uretdione and/or isocyanurate groups have an average NCO functionality greater than 2, preferably 2.5 to 6. These polyisocyanates may contain aromatically, cycloaliphatically and/or aliphatically bound isocyanate groups. Polyisocyanates containing aliphatically and/or cycloaliphatically bound isocyanate groups are preferred for light-fast coatings.

The lacquer polyisocyanates are produced by the known modification of monomeric diisocyanates to form biuret, urethane, allophanate, uretdione and/or isocyanurate. Any excess monomer isocyanate, which may be present after the modification reaction, is removed in known manner, preferably by distillation, such that the lacquer polyisocyanates contain at most 0.7, preferably at most 0.5% by weight of monomeric diisocyanate. The lacquer polyisocyanates preferably have an NCO content, based on solids, of 10 to 30% by weight, preferably 15 to 25% by weight.

The two-component PUR coating compositions may be used for the both refinish and factory coating of automobiles and for general industrial coatings, preferably for coating wood and furniture.

The invention is further illustrated but is not intended to be limited by the following examples in which all parts and percentages are by weight unless otherwise specified.

EXAMPLES

Polyacrylate A

A polyacrylate produced by the polymerization of methyl methacrylate (MMA), 2-ethylhexyl acrylate (2-EHA) and hydroxyethyl methacrylate (HEMA) and present as a 40% solution in butyl acetate. Tert.-butylperoxy-2-ethylhexanoate was used as the initiator. The polymerization temperature was 110° C. After polymerization, the solids content was 39.6% and the solution viscosity was 2450 mPa.s/23° C. The OH content was 0.48% on a solvent-free basis.

Polyacrylate B

A polyacrylate produced by the polymerization of MMA, butyl acrylate (BA), 2-EHA and hydroxypropyl methacrylate (HPMA) and present as a 50% solution in butyl acetate. Di-tert.-butyl peroxide was used as the initiator. The polymerization temperature was 150° C. After polymerization, the solids content was 49.8% and the solution viscosity was 4120 mPa.s/23° C. The OH content was 1.0% on a solvent-free basis.

Determination of residual monomers by head-space chromatography

The content of residual monomers was determined by head-space analysis. In this procedure, samples were diluted with a high-boiling solvent and introduced into an ampoule, which was accessible via a septum, and then sealed. After sealing the sample was heated to 100° C. until an equilibrium had been established between the liquid and gaseous phases. A defined amount of sample from the gas space was then injected into the capillary column.

The monomer contents of polyacrylates A and B, which were determined by the head-space gas chromatography method, are set forth in the following table.

Initial monomer contents of polyacrylates A) and B) in %, based on solids

|  | MMA | 2-EHA | Butyl acrylate | HEMA | HPMA |
|---|---|---|---|---|---|
| Polyacrylate A (%) | 0.98 | 0.25 | — | <0.1 | — |
| Polyacrylate B (%) | 1.05 | 0.21 | 0.19 | — | <0.1 |

A total value of about 1.2 to 1.4% by weight of residual acrylate monomer was determined by head-space GC after the production of the polyacrylates A) and B).

Examples 1 to 6 according to the invention 1000 g of polyacrylates A and B were placed in a vessel, mixed with maleic anhydride and a peroxide initiator and then heated for 2 hours. Thereafter, the residual monomer content was determined by head-space analysis.

|  | Example | | | | | |
|---|---|---|---|---|---|---|
|  | 1 | 2 | 3 | 4 | 5 | 6 |
| Polyacrylate A, g | 1000 | 1000 | 1000 | — | — | — |
| Polyacrylate B, g | — | — | — | 1000 | 1000 | 1000 |
| Maleic anhydride, g | 10 | 20 | 5 | 10 | 20 | 5 |
| Tert.-butyl-peroxy-2-ethylexanoate*, g | 10 | 20 | 15 | — | — | — |
| Di-tert.-butyl peroxide, g | — | — | — | 5 | 10 | 7.5 |
| Reaction temperature, °C. | 110 | 110 | 110 | 150 | 150 | 150 |

*present as a 50% solution in butyl acetate, amount based on solution

Residual monomer contents for Examples 1 to 6 (data in g)

|  | Example | | | | | |
|---|---|---|---|---|---|---|
|  | 1 | 2 | 3 | 4 | 5 | 6 |
| MMA, g | <0.1 | <0.1 | 0.16 | <0.1 | 0.1 | 0.12 |
| 2-EHA, g | <0.1 | <0.1 | <0.1 | <0.1 | <0.1 | <0.1 |
| BA, g | — | — | — | 0.12 | <0.1 | 0.11 |
| HEMA, g | <0.1 | <0.1 | <0.1 | — | — | — |
| HPMA, g | — | — | — | <0.1 | <0.1 | <0.1 |

Coatings were prepared by mixing polyacrylates A) and B), both before and after the treatment according to the present invention, at an NCO:OH equivalent ratio of 1:1 with a lacquer polyisocyanate which contained isocyanurate groups, was prepared from hexamethylene diisocyanate and had an NCO content of 19.4% by weight (Desmodur N 3390). The results demonstrated that the treatment according to the invention did not affect the application properties of the coatings.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a polyacrylate resin having a residual acrylate monomer content of <0.1% by weight, based on resin solids, by preparing an initial polyacrylate resin and subsequently polymerizing this initial polyacrylate resin in the presence of maleic anhydride and a peroxide initiator to reduce the monomer content.

2. The process of claim 1 wherein the initial polyacrylate resin is prepared by the radically-induced copolymerization of
   A) 0 to 50% by weight of a hydroxyalkyl esters of acrylic and/or methacrylic acid,
   B) 30 to 90% by weight of methyl methacrylate,
   C) 0 to 50% by weight of styrene,
   D) 0 to 5% by weight of an olefinically unsaturated carboxylic acid, and
   E) 0 to 50% by weight of an olefinically unsaturated monomer other than monomers A) to D).

3. The process of claim 1 wherein maleic anhydride is present in an amount of 0.5 to 3% by weight, the peroxide is present in an amount of 0.5 to 3% by weight, wherein the percentages are based on the weight of the initial polyacrylate resin, and the polymerization reaction is conducted for about 1 to 3 hours.

4. The process of claim 2 wherein maleic anhydride is present in an amount of 0.5 to 3% by weight, the peroxide is present in an amount of 0.5 to 3% by weight, wherein the percentages are based on the weight of the initial polyacrylate resin, and the polymerization reaction is conducted for about 1 to 3 hours.

5. The process of claim 1 wherein maleic anhydride is present in an amount of 1 to 2% by weight, the peroxide is present in an amount of 1 to 2% by weight, wherein the percentages are based on the weight of the initial polyacrylate resin, and the polymerization reaction is conducted for about 1 to 2 hours.

6. The process of claim 2 wherein maleic anhydride is present in an amount of 1 to 2% by weight, the peroxide is present in an amount of 1 to 2% by weight, wherein the percentages are based on the weight of the initial polyacrylate resin, and the polymerization reaction is conducted for about 1 to 2 hours.

7. The process of claim 1 wherein the peroxide initiator comprises tert.-butyl-peroxy-2-ethylhexanoate and/or di-tert.-butyl peroxide.

8. The process of claim 2 wherein the peroxide initiator comprises tert.-butyl-peroxy-2-ethylhexanoate and/or di-tert.-butyl peroxide.

9. The process of claim 3 wherein the peroxide initiator comprises tert.-butyl-peroxy-2-ethylhexanoate and/or di-tert.-butyl peroxide.

10. The process of claim 4 wherein the peroxide initiator comprises tert.-butyl-peroxy-2-ethylhexanoate and/or di-tert.-butyl peroxide.

* * * * *